Figure 1:
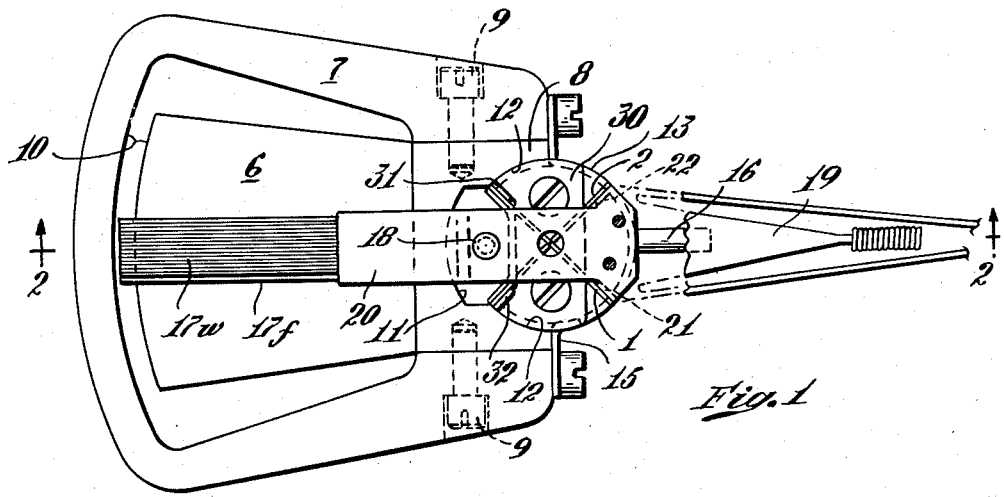

Oct. 27, 1959  R. A. AMMON  2,910,631
ELECTRICAL INSTRUMENT MECHANISM
Filed May 28, 1957  2 Sheets-Sheet 1

Inventor
Roscoe A. Ammon
by Roberts, Cushman & Grover
Attys

Oct. 27, 1959　　　R. A. AMMON　　　2,910,631
ELECTRICAL INSTRUMENT MECHANISM
Filed May 28, 1957　　　　　　　　2 Sheets-Sheet 2
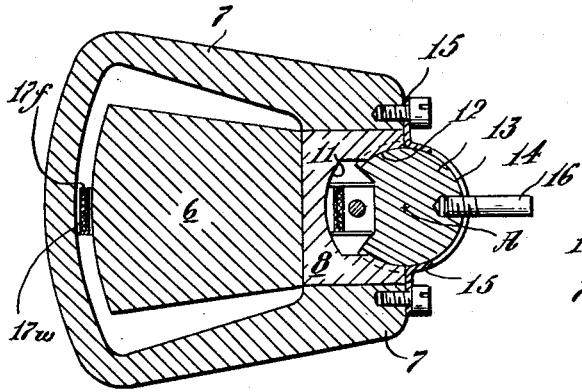
Fig. 4
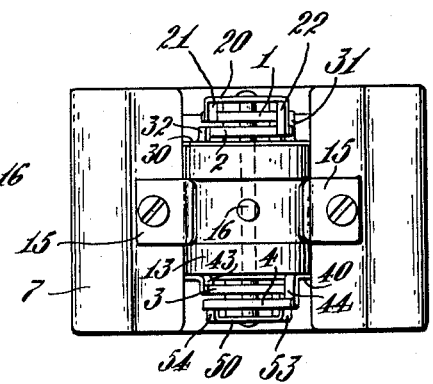
Fig. 5
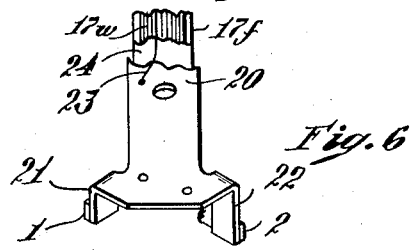
Fig. 6
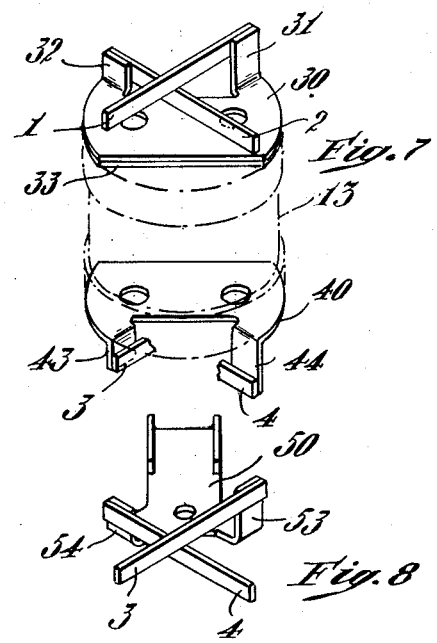
Fig. 7
Fig. 8
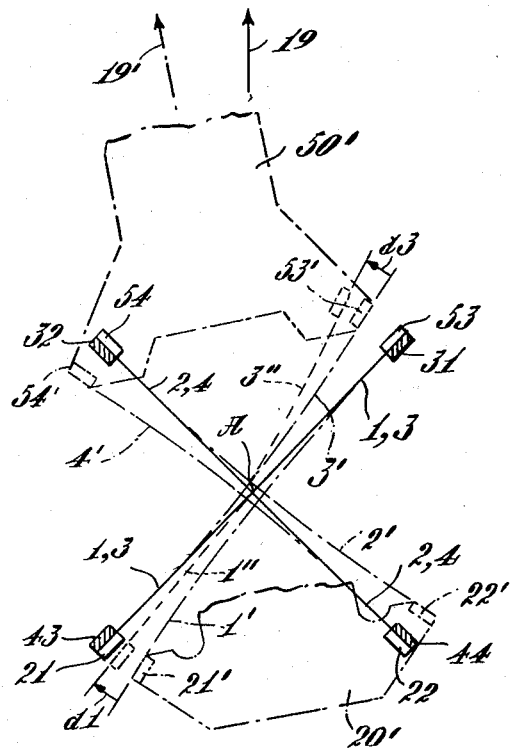
Fig. 9
Inventor
Roscoe A. Ammon
by Roberts, Cushman & Grover
Attys

United States Patent Office 2,910,631
Patented Oct. 27, 1959

2,910,631

ELECTRICAL INSTRUMENT MECHANISM

Roscoe A. Ammon, Manchester, N.H., assignor, by mesne assignments, to Minneapolis-Honeywell Regulator Company, a corporation of Delaware Application May 28, 1957, Serial No. 662,167

19 Claims. (Cl. 317—166)

This invention relates to electrical instrument mechanisms such as moving coil meters and relays and particularly to the mounting of the moving member of such mechanisms.

One object of the invention is to provide a pivot for the moving member of an instrument mechanism which provides the support and restoring force for the member and in the case of a moving coil, supplies current to the coil to cause it to deflect.

According to the invention an instrument mechanism comprises a magnetic field structure forming an air gap and including frame means, a coil and a support therefor adapted to rotate in said air gap about an axis, two sets of crossed leaf springs interconnecting said coil support and frame means to support said coil in said air gap and resiliently resist rotation of the coil about said axis, one of said springs being insulated from said frame and coil support, and being electrically connected to said coil to supply current thereto.

Such an instrument mechanism is quite useful for fixed installations wherein the position of the instrument is stable with respect to the earth's gravitation of field. However, in mobile installations, as in vehicles, vessels and aircraft, the instrument will, by movement of the vehicle, be inclined into various positions. One or more of the leaf springs are thereby placed under varying tension or compression by the weight of the moving member supported on the springs, and the spring rate (and generally the resilient resistance) of the leaf will decrease when the spring is under compression and will increase when it is under tension. Thus upon movement of the frame between different positions the spring rate (and for a given deflection of the moving member, the resilient resistance) of a leaf will vary and thereby produce erroneous deflections of the moving member.

Therefore another object of the invention is to compensate for changes in spring rate due to tension and compression so as substantially to eliminate error resulting therefrom.

Thus further according to the invention the leaves of respective sets of springs are interconnected between the aforementioned frame and moving member such that in various positions of the frame at least one leaf of one set is in tension and one is in compression due to the weight of the member. Thereby the net spring rate of the leafs is maintained substantially constant in various positions of the frame.

Figure 2:
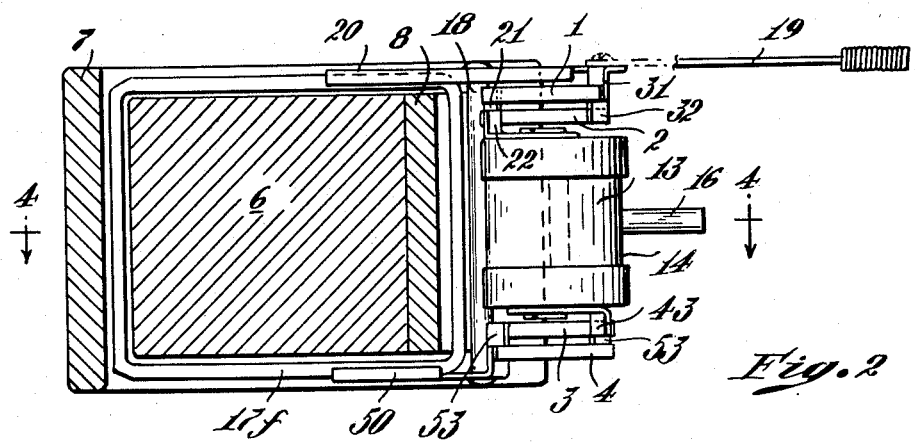
Figure 3:
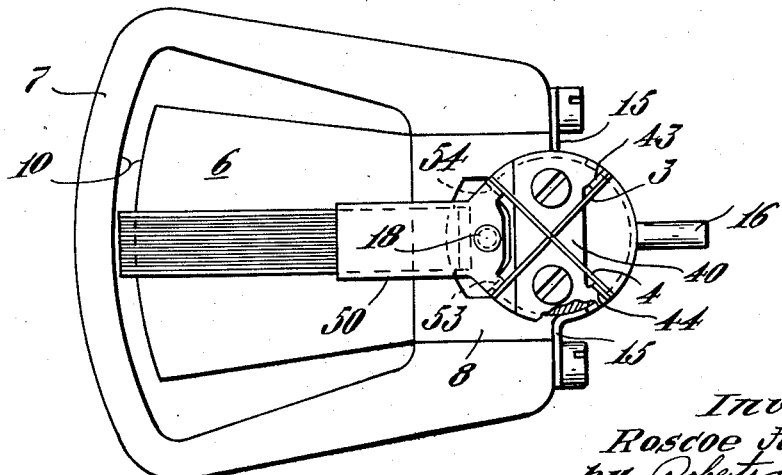

For the purpose of illustration a typical embodiment of the invention is shown in the accompanying drawings in which:

Fig. 1 is a top plan view of a moving coil meter;
Fig. 2 is a section on line 2—2 of Fig. 1;
Fig. 3 is a bottom plan view;
Fig. 4 is a section on line 4—4 of Fig. 2;
Fig. 5 is an end view of the meter, parts being omitted;
Figs. 6 to 8 are isometric views showing the pivot structure of the meter; and Fig. 9 is a schematic diagram illustrating deflection of the meter.

As shown in the figures the meter generally comprises a keystone shaped permanent magnet core 6 secured by soldering to a soft iron return path including a yoke 7 and a frame block 8 secured to the yoke 7 by screws 9. Extending through the frame block 8 is a recess 11 having cylindrical faces 12 against which a cylindrical support block 13 seats. The support block 13 has an annular recess 14 in which are seated detents 15 secured by screws which serve to hold the support block 13 against the cylindrical faces 12 in the recess 11 so that it may be rotatably adjusted about an axis A coincident with the axis of the cylindrical block 13. A lever 16 is threaded in the support block 13 to facilitate rotational adjustment of the block.

As will be more fully explained, a coil comprising a frame 17f and winding 17w is mounted on the support block 13 for rotation or deflection about the axis A. The coil forms a closed loop passing through the recess 11 and the air gap 10 between the yoke 7 and the core 6. Secured to the coil form 17f are a top plate 20 and a bottom plate 50 mechanically reinforced by a pin 18 extending between the two plates, and insulated from the upper plate. Attached to the top coil plate 20 is a pointer assembly 19 which counterbalances the coil and plate assembly on the axis A. The coil and pointer assembly are rotatably supported on the support block 13 by leaf springs 1, 2, 3 and 4 interconnecting the coil plates 20 and 50 with similar plates 30 and 40 secured to the support block 13.

By way of example, the leaf springs may be made of Phosphor bronze or a stainless steel such as that known under the trademark Elgiloy. Typical dimensions for a coil-pointer movement having a fifty gram-centimeter torque are 0.375 inch length, 0.050 inch width and 0.002 inch thickness. The opposite ends of the respective leaf springs are secured to anchoring ears on the coil and support block plates. Thus, the uppermost leaf spring 1 is connected between an ear 21 on the top coil plate 20 and an ear 31 on the top support block plate 30. Similarly the other upper leaf spring 2 is interconnected between ears 22 and 32 respectively on the upper coil plate 20 and plate 30. The lower pair of leaf springs 3 and 4 are interconnected between ears 43 and 44 and ears 53 and 54 respectively on the bottom support block plate 40 and bottom coil plate 50.

The leaf springs are preferably crossed at right angles, although it is possible to cross them at greater or lesser angles, and it is also possible to locate the cross point beyond the ends of the leaf springs. Two pairs or sets of springs are shown, but it is also possible to use more than two pairs or sets, and more than two springs may be used in a set.

As shown the leaves mount the coil for rotation about the axis A providing both support for the coil and the restoring force tending to hold the coil in the rest or zero current position shown in Figs. 1 to 8. Preferably one or both leafs of one set are insulated from the support block 13 and the coil frame 17f, so that the leaf may be used to conduct current to the coil winding. As shown in Fig. 6 a wire connection 23 is made between the aluminum upper coil plate 20, and one winding of the coil 17f. The coil plate 20 is insulated from the coil frame 17w by an insulating sheet 24, and an insulating spacer 33 is placed between the aluminum upper support plate 30 and the support block 13. An insulated current path is thus provided from the stationary support plate through the anchoring ears 31 and 32, thence through the leaves 1 and 2, the ears 21 and 22 and the upper coil plate 20 to the coil winding 17w.

The coil and pointer may be zero set in any position along the arc of the air gap 10 by loosening the detents 15 and rotating the support block 13.

As shown in Fig. 9 when a current in the moving coil causes deflection of the coil against the resilient resistance of the leaf springs 1 to 4, the leaf springs will flex from the rest position shown in solid lines (in which the upper leaves 1 and 2 overlie the lower leaves 3 and 4) to deflected positions 1', 2', 3' and 4' shown in dot-dash lines. Movement of the coil is represented by swinging of the upper and lower coil plates about the axis A to deflected positions 20' and 50'. The anchoring ears on plates 20 and 50 will of course move with the plates to deflected positions 21', 22', 53' and 54', while the anchoring ears 31, 32, 43, 44 on the support block plates 30 and 40 remain stationary. The pointer 19 attached to the upper coil plate 20 deflects to position 19'.

Assuming that the instrument shown schematically in Fig. 9 is mounted in a stationary installation with the axis A extending vertically with reference to the earth's gravitational field, the weight of the coil and pointer assembly will be applied equally to all springs, and the stresses upon them will be equal. The spring rate (ratio of restoring force to deflection) will remain constant for various deflections of the coil and pointer, and the deflection will be in a correct predetermined proportion (sensitivity) to the applied current. The described condition of equal stress and constant spring rate applies, even if the support block anchoring ears 31, 32, 43 and 44 are all on one side of the axis A, so long as the axis A is vertical.

However, if the instrument is tipped, for example, to a position such that the leaves 1 and 3 are approximately vertical and the leaves 2 and 4, and the axis A are horizontal with respect to the earth's gravitational field unequal stresses are applied to the leaves.

This condition may be visualized by inclining Fig. 9 so that the dot-dash lines 1' and 3' are vertical and the dot-dash lines 2' and 4' are horizontal. Understanding that the cross-hatched rectangles 31, 32, 43 and 44 are the stationary ears on the support block, and that the weight of the coil-pointer assembly acts through the ears 21', 22', 53' and 54' of the coil plates 20 and 50, the following stresses are seen to exist. Substantially flexure, and neither compression nor tension are applied by the weight acting through the ears in positions 22' and 54' on leaves in positions 2' and 4'. The ear in position 21', however represents one quarter of the weight of the coil-pointer assembly, and this weight is acting downward away from the fixed anchoring ear 31 placing the leaf 1 in position 1' under tension. Conversely, the ear in position 53', representing one quarter of the weight is acting downward toward the fixed support block ear 43, placing leaf 3 in position 3' under compression.

It has been found that compression decreases the spring rate or stiffness of a leaf and that tension increases the spring rate. If both springs 1 and 3 were anchored at 43, so that both were under compression, the decrease in spring rate or stiffness would be additive and would introduce a substantial error in deflection of the pointer 19. As shown in Fig. 9, however, they are oppositely anchored so that the increased stiffness of leaf 1 due to tension tends to produce a deflection error $d1$ in a clockwise direction toward the dashed line position 1", and the decreased stiffness of leaf 3 under compression tends to produce a deflection error $d3$ in a counter-clockwise direction toward the dashed line position 3". Leaves 1 and 3 cannot move in counter directions since they are interconnected through ears 21 and 53 by the rigid structure of the coil and plate assembly. Thus because the two tendencies to error apply substantially equal and opposite couples to the coil assembly, there is no actual error deflection of the coil or its pointer, which will remain in position 19' in accurate response to the applied current.

Thus in the imagined position of Fig. 9, the structure of the present meter affords a gravity compensation for compression and tension spring rate errors in leaves 1 and 3. In various other positions of the axis A with respect to the earth's gravitational field, it will be understood that various unequal tensions and compressions will be applied to leaves 1 and 2 of the upper set and leaves 3 and 4 of the lower set, but that in each position the tension of a leaf in one seat will be compensated by compression in a leaf in the other set so that the net spring rate of both sets of leaves remains constant.

The gravity compensation thus afforded is of considerable importance in navigational instruments, particularly in aircraft instruments which are subjected to high acceleration forces having the same effect as gravity, since the error in oscillation period of an uncompensated moving coil may reach 50%. However, it will be understood that the present invention comprises all instrument mechanisms falling within the appended claims, and their modifications and equivalents.

I claim:

1. An instrument mechanism comprising a frame, a member adapted to rotate about an axis, and at least two sets of crossed leaf springs spaced apart on said axis in planes substantially parallel thereto, the leaves of respective sets being interconnected between said frame and member such that in various positions of the frame at least one leaf of one set is in tension and one leaf of another set is in compression due to the weight of said member.

2. An instrument mechanism comprising a frame, a member adapted to rotate about an axis, at least two sets of crossed leaf springs spaced apart on said axis in planes substantially parallel thereto, the leaves of respective sets being interconnected between said frame and member to support said member on said frame and resiliently resist rotation of said member about said axis, the springs of respective sets being connected at different locations with respect to said axis such that in various positions of the frame at least one leaf of one set is in tension and one leaf of another set is in compression due to the weight of said member, whereby the net spring rate of said leaves is maintained substantially constant in various positions of the frame.

3. An instrument mechanism comprising a frame, support means on the frame rotatable about an axis, a member adapted to rotate about said axis, and two sets of crossed leaf springs spaced apart on said axis in planes substantially parallel thereto and interconnecting said support means and member, the leaf springs of one set being connected to said support means at one set of locations with respect to said axis, and the leaf springs of the other set being connected at opposite locations with respect to said axis, such that in various positions of the frame at least one leaf of one set is in tension and one leaf of the other set is in compression due to the weight of said member.

4. An instrument mechanism comprising a frame including a rotatable support, a member adapted to rotate about an axis, at least two sets of crossed leaf springs spaced apart on said axis in planes substantially parallel thereto, the leaves of respective sets being interconnected between said support and member such that in various positions of the frame at least one leaf of one set is in tension and one leaf of another set is in compression due to the weight of said member.

5. An instrument mechanism comprising a frame including a support block rotatable about an axis, a member adapted to rotate about said axis in planes substantially parallel thereto, the leaves of respective sets being interconnected between said block and member such that in various positions of the frame at least one leaf of one set is in tension and one leaf of another set is in compression due to the weight of said member, said block being adjustable to vary the rest position of said member, and means for securing said block in adjusted position.

6. An instrument mechanism comprising a frame, including a support block rotatable about an axis, a member adapted to rotate about said axis, and two sets of crossed leaf springs spaced apart on said axis in planes substantially parallel thereto, said block having anchoring elements at opposite ends of said block, the anchoring elements at one end being disposed at opposite sides of the axis from the anchoring elements at the other end and the leaves of respective sets being interconnected between said anchoring elements and member such that in various positions of the frame at least one leaf of one set is in tension and one leaf of another set is in compression due to the weight of said member.

7. An instrument mechanism comprising a frame, a member adapted to rotate about an axis, a plurality of sets of crossed, flexure springs at locations spaced along said axis, each of said springs being generally directed across said axis and connected at opposite ends to said frame and said member so as to support said member on said frame and resiliently resist rotation about said axis, the ends of the springs of one set on one side of said axis being connected to said support and the ends of the springs of the other set on the same said side of said axis being connected to the member, so that, at various positions of said frame relative to the earth's gravitational field, tension on one spring of one set is compensated by compression on a spring of the other set whereby the net spring rate of said springs is maintained substantially constant in various positions of the frame.

8. An electrical instrument comprising a magnetic field structure forming an air gap and including frame means, a coil adapted to rotate in said air gap about an axis, two sets of crossed leaf springs interconnecting said coil and frame means to support said coil in said air gap and resiliently resist rotation of the coil about said axis, said leaf springs being connected such that at various positions of said frame means relative to the earth's gravitational field, tension on one spring of one set is compensated by compression on a spring of the other set, whereby the net spring rate of said springs is maintained substantially constant in various positions of the frame means.

9. An electrical instrument comprising a magnetic field structure forming an air gap and including frame means, a coil adapted to rotate in said air gap about an axis, two sets of crossed leaf springs interconnecting said coil and support block to support said coil in said air gap and resiliently resist rotation of the coil about said axis, the springs of the respective sets being connected at different radial locations with respect to said axis, so that, at various positions of said frame means relative to the earth's gravitational field, tension on one spring of one set is compensated by compression on a spring of the other set, whereby the net spring rate of said springs is maintained substantially constant in various positions of the frame means.

10. An electrical instrument comprising a magnetic field structure forming an air gap and including frame means, a support block mounted on said frame means to rotate about an axis, a coil adapted to rotate in said air gap about said axis, two sets of crossed leaf springs interconnecting said coil and support block to support said coil in said air gap and resiliently resist rotation of the coil about said axis, said block having anchoring means at opposite ends thereof, the anchoring means for one set being located on one side of said axis and the anchoring means for the other set being located on the opposite side of said axis, so that, at various positions of said frame means relative to the earth's gravitational field, tension on one spring of one set is compensated by compression on a spring of the other set, whereby the net spring rate of said springs is maintained substantially constant in various positions of the frame means.

11. An electrical instrument comprising a magnetic field structure forming an air gap and including frame means, a coil support adapted to rotate in said air gap about an axis, two sets of crossed leaf springs interconnecting said coil support and frame means to support said coil in said air gap and resiliently resist rotation of the coil support about said axis, the springs of the respective sets being connected at different locations with respect to said axis, and one of said springs being insulated from said frame and coil support and being connected to said coil to supply current thereto, whereby at constant current and in various positions of said frame means relative to the earth's gravitational field, tension on one spring of one set is compensated by compression on a spring of the other set, so that the net spring rate of said springs is maintained substantially constant in various positions of the frame means.

12. An electrical instrument comprising a magnetic field structure forming an air gap and including frame means, a support block mounted in said frame means to rotate about an axis, a coil and a support therefor adapted to rotate in said air gap about said axis, two sets of crossed leaf springs interconnecting said coil support and support block to support said coil in said air gap and resiliently resist rotation of the coil about said axis, said block having anchoring means at opposite ends thereof, the anchoring means for one set being located on one side of said axis and the anchoring means for the other set being located on the opposite side of said axis, and said coil support having anchoring means respectively diametrically opposed to said support block anchoring means, one anchoring means respectively on said support block and coil support being insulated therefrom and one spring supported on said insulated anchoring means being electrically connected to said coil to supply current thereto, whereby at constant current and in various positions of said frame means relative to the earth's gravitational field, tension on one spring of one set is compensated by compression on a spring of the other set, so that the net spring rate of said springs is maintained substantially constant in various positions of the frame means.

13. An electrical instrument comprising a magnetic field structure forming an air gap and including frame means, a support block mounted in said frame means to rotate about an axis, a coil and a support therefor adapted to rotate in said air gap about said axis, two sets of crossed leaf springs interconnecting said coil support and support block to support said coil in said air gap and resiliently resist rotation of the coil about said axis, said block having anchoring means at opposite ends thereof, and said coil support having anchoring means respectively diametrically opposed to said support block anchoring means, one anchoring means respectively on said support block and coil support being insulated therefrom and said one spring being electrically connected to said coil to supply current thereto.

14. An instrument mechanism comprising a frame including a support block rotatable about an axis, a member adapted to rotate about said axis, at least two sets of crossed leaf springs spaced apart on said axis in planes substantially parallel thereto, the leaves of respective sets being interconnected between said block and member to support said member and resiliently resist rotation of said member about said axis, said block being adjustable to vary the rest position of said member, and means for securing said block in adjusted position.

15. A moving coil mechanism comprising a magnetic field structure including a core and a yoke forming an air gap, a coil disposed about at least a part of said core and adapted to rotate in said air gap about an axis spaced from said air gap, frame means on said field structure, two sets of crossed leaf springs interconnecting said frame means and said coil to support said coil in said air gap and resiliently resist rotation of the coil about said axis, and means to supply current to said coil and cause deflection of the coil from a rest position, said frame means including means for adjusting at least one of the springs relative to said field structure thereby to adjust the rest position of said coil, and said field structure, frame, coil and springs forming a unitary structure.

16. A moving coil mechanism comprising a magnetic field structure including a core and a yoke forming an air gap, a coil and a frame therefor extending through and adapted to rotate in said air gap about an axis spaced from said air gap, anchoring means on said field structure, two sets of crossed leaf springs interconnecting said anchoring means and said coil frame to support said coil frame in said air gap and resiliently resist rotation of the coil frame about said axis, means to supply current to said coil and cause deflection of the coil frame from a rest position, and means to adjust the rest position of said coil frame, said field structure, anchoring means, coil frame, adjusting means and springs forming a unitary structure.

17. A moving coil mechanism comprising a magnetic field structure including a core and a yoke forming an air gap, a coil and a frame therefor extending through and adapted to rotate in said air gap about an axis spaced from said air gap, anchoring means on said field structure, two sets of crossed leaf springs interconnecting said anchoring means and said coil frame to support said coil frame in said air gap and resiliently resist rotation of the coil frame about said axis, means to supply current to said coil and cause deflection of the coil frame from a rest position, and means movably attached to said yoke to adjust the rest position of said coil frame, said field structure, anchoring means, coil frame, adjusting means and springs forming a unitary structure.

18. A moving coil mechanism comprising a magnetic field structure including a core and a yoke forming an air gap, a coil and a frame therefor extending through and adapted to rotate in said air gap about an axis spaced from said air gap, said core having magnetic poles and said yoke forming a flux path from the air gap at one pole to the other pole, anchoring means on said yoke outside the flux path with respect to said other pole, two sets of crossed leaf springs interconnecting said anchoring means and said coil frame to support said coil frame in said air gap and resiliently resist rotation of the coil frame about said axis, means to supply current to said coil and cause deflection of the coil frame from a rest position, and means to adjust the rest position of said coil frame, said field structure, anchoring means, coil frame, adjusting means and springs forming a unitary structure.

19. A moving coil mechanism comprising a magnetic field structure including a core and a yoke forming an air gap, a coil and a frame therefor extending through and adapted to rotate in said air gap about an axis spaced from said air gap, said core having magnetic poles and said yoke forming a flux path from the air gap at one pole to the other pole, anchoring means on said yoke outside the flux path with respect to said other pole, two sets of crossed leaf springs interconnecting said anchoring means and said coil frame to support said coil frame in said air gap and resiliently resist rotation of the coil frame about said axis, means to supply current to said coil and cause deflection of the coil frame from a rest position, and means movably attached to said yoke to adjust the rest position of said coil frame, said field structure, anchoring means, coil frame, adjusting means and springs forming a unitary structure.

References Cited in the file of this patent
UNITED STATES PATENTS

| | | |
|---|---|---|
| 2,584,749 | Snavely | Feb. 5, 1952 |
| 2,776,404 | Caldecourt | Jan. 1, 1957 |
| 2,800,553 | Ammon | July 23, 1957 |